United States Patent
Sakamoto et al.

(10) Patent No.: US 11,423,661 B2
(45) Date of Patent: Aug. 23, 2022

(54) OBJECT RECOGNITION APPARATUS

(71) Applicant: TOYOTA JIDOSHA KABUSHIKI KAISHA, Toyota (JP)

(72) Inventors: Hiroshi Sakamoto, Susono (JP); Ryosuke Fukatani, Susono (JP); Hideyuki Matsui, Shizuoka-ken (JP); Junya Ueno, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/926,817

(22) Filed: Jul. 13, 2020

(65) Prior Publication Data

US 2021/0019534 A1 Jan. 21, 2021

(30) Foreign Application Priority Data

Jul. 17, 2019 (JP) .............................. JP2019-131937

(51) Int. Cl.
*G06V 20/56* (2022.01)
*G06K 9/62* (2022.01)
(Continued)

(52) U.S. Cl.
CPC ........... *G06V 20/56* (2022.01); *G06K 9/6218* (2013.01); *G06K 9/6262* (2013.01); *G06K 9/6267* (2013.01); *G06K 9/6293* (2013.01); *G01S 13/867* (2013.01); *G01S 13/931* (2013.01); *G01S 2013/9323* (2020.01)

(58) Field of Classification Search
CPC ............. G06K 9/00791; G06K 9/6218; G06K 9/6262; G06K 9/6267; G06K 9/6293
See application file for complete search history.

(56) References Cited

U.S. PATENT DOCUMENTS 6,801,638 B1 * 10/2004 Janssen .................. B60K 35/00
382/104
10,740,625 B2 * 8/2020 Satomura ............. G08G 1/0967
(Continued)

FOREIGN PATENT DOCUMENTS

| JP | 2007274037 A | 10/2007 |
| JP | 2018147399 A | 9/2018 |
| WO | 2011160672 A | 12/2011 |

*Primary Examiner* — Utpal D Shah
(74) *Attorney, Agent, or Firm* — Dickinson Wright, PLLC

(57) ABSTRACT

An object recognition apparatus include a storage device and a processor. The storage device stores peripheral information and tolerance information. The tolerance information is information in which the degree of tolerance for the undetected object is represented for each class of the object. The peripheral information is acquired by a sensor device provided in the vehicle. The processor performs object recognition process for recognizing an object around the vehicle. In the object recognition process, the processor identifies the object and its class to be detected based on the peripheral information, and calculates the likelihood that is a parameter representing the probability of detection of the object. Further, the processor calculates a likelihood threshold corresponding to the object based on the tolerance information, and determines whether to output the identification result of the object based on the comparative between the likelihood and the likelihood threshold.

5 Claims, 14 Drawing Sheets

(51) Int. Cl.
   *G01S 13/86*   (2006.01)
   *G01S 13/931*   (2020.01)

(56) References Cited

U.S. PATENT DOCUMENTS

| | | | | |
|---|---|---|---|---|
| 10,755,421 | B2* | 8/2020 | Hasejima | H04N 7/183 |
| 10,821,946 | B2* | 11/2020 | Kim | B60W 50/14 |
| 11,048,982 | B2* | 6/2021 | Steelberg | G06T 11/20 |
| 2015/0158495 | A1* | 6/2015 | Duncan | G08G 1/096716 |
| | | | | 701/1 |
| 2017/0201687 | A1 | 7/2017 | Edney | |
| 2018/0259329 | A1 | 9/2018 | Yokoi | |
| 2018/0365888 | A1* | 12/2018 | Satzoda | G06K 9/00791 |
| 2019/0171215 | A1* | 6/2019 | Tatourian | G05D 1/0088 |
| 2019/0208136 | A1 | 7/2019 | Wendel et al. | |
| 2020/0159214 | A1* | 5/2020 | Misu | G05D 1/0246 |
| 2020/0202144 | A1* | 6/2020 | Porter | G06K 9/6262 |
| 2021/0166139 | A1* | 6/2021 | Fujimura | G06K 9/6217 |

\* cited by examiner

| CLASS | TOLERANCE |
|---|---|
| VEHICLE | R_car |
| PEDESTRIAN | R_ped |
| MOTORCYCLE | R_motorbike |
| BICYCLE | R_bike |
| ... | ... |

*FIG. 2*

| SENSOR | MEASUREMENT ACCURACY (POSITION) | MEASUREMENT ACCURACY (VELOCITY) | RESOLUTION | MEASUREMENT RANGE |
|---|---|---|---|---|
| LIDAR | ○ | △ | △ | △ |
| RADAR | △ | ○ | × | ○ |
| CAMERA | △ | × | ○ | ○ |

FIG. 4

OBJECT RECOGNITION APPARATUS

CROSS-REFERENCE TO RELATED APPLICATION

The present application is based on, and claims priority from, Japanese Patent Application Serial Number 2019-131937, filed on Jul. 17, 2019, the disclosure of which is hereby incorporated by reference herein in its entirety.

BACKGROUND

Field

The present disclosure relates to an object recognition apparatus for recognizing an object around a vehicle.

Background

Japanese Patent Application Laid-Open No. 2018-147399 discloses a technique relating to a target object detection apparatus for determining that a target object is a crossing target object based on an optical flow of the target object. A target detection device of this technique detects a target using millimeter-wave radar waves, and calculates a total likelihood representing the probability that the target is a crossing object of a pedestrian traversing the front of the vehicle. When it is determined that the total likelihood is equal to or greater than a preset threshold value, the detected target is determined to be a crossing target of the pedestrian.

SUMMARY

In object detection, likelihood representing the degree of probability (reliability) is detected along with a class of objects. In the above technique, the detection of the object is determined by comparing the detected likelihood with a likelihood threshold. By setting the likelihood threshold low, it is possible to reduce the possibility that an object has not been detected, compared with the case where the likelihood threshold is set high. However, the likelihood threshold may not be set low in consideration of safety. This is because the possibility of erroneous detection of an object increases as the likelihood threshold is set lower. Erroneous detection of an object leads to performing deceleration or avoidance operation which was originally unnecessary, there is a possibility that the smooth running of the vehicle is hindered. For this reason, in order to efficiently detect an object, it is required to set the likelihood threshold after judging to what extent the risk with respect to the undetected object can be tolerated.

Here, the risk when undetected in object detection occurs differs depending on the class of the object. For example, comparing pedestrians with stationary objects, it can be said that the risk to undetected is higher for pedestrians. In the above technique, when detecting an object, information on the risk of each class of the object is not considered. This leaves room for improvement over the above technique for efficient detection of objects.

An object of the present disclosure is to provide an object recognition apparatus capable of performing efficient object detection according to an object class.

In order to solve the above problems, the first disclosure is applied to an object recognition apparatus for recognizing an object around a vehicle. The vehicle includes a sensor device to acquire peripheral information. The object recognition apparatus includes a storage device to store the peripheral information and tolerance information in which tolerance for the undetected object is represented for each class of the object, and a processor to perform object recognition process for recognizing the object around the vehicle. In in the object recognition process, the processor is configured to identify an object to be detected and a class of the object based on the peripheral information, calculate likelihood that is a parameter representing a probability of detection of the object, calculate a likelihood threshold corresponding to the object based on the tolerance information, and determine whether to output an identification result of the object based on a comparative between the likelihood and the likelihood threshold.

The second disclosure further includes the following features in the first disclosure.

The storage device is configured to store a plurality of tolerance information associated with a self-position of the vehicle. In in the object recognition process, the processor is configured to detect the self-position, select tolerance information corresponding to the self-position from the plurality of tolerance information, and calculate the likelihood threshold corresponding to the object based on the selected tolerance information.

The third disclosure further includes the following features in the first disclosure.

The storage device is configured to store a plurality of tolerance information associated with a peripheral environment condition of the vehicle. In in the object recognition process, the processor is configured to detect the peripheral environment condition around the vehicle, and select tolerance information corresponding to the peripheral environment condition from the plurality of tolerance information. The processor is configured to calculate the likelihood threshold corresponding to the object based on the selected tolerance information.

The fourth disclosure further includes the following features in the third disclosure.

The peripheral environment condition includes rainfall condition indicating the amount of rainfall around the vehicle. In the object recognition process, the processor is configured to detect a rainfall amount as the peripheral environment condition.

The fifth disclose further includes the following features in the third disclosure.

The peripheral environment condition includes an illuminance condition indicating the illuminance of the surroundings of the vehicle. In the object recognition process, the processor in configured to detect illuminance as the peripheral environment condition.

The sixth disclose further includes the following features in any one of the first to fifth disclosures.

The sensor device includes an imaging device to acquire an image of the surrounding environment. The vehicle further comprises a ranging sensor to measure ranging data. The processor is configured to perform a clustering process for clustering the ranging data, and perform a fusion process of recognizing a ranging point group targeted by the clustering process and the identification result as the same object.

According to the object recognition apparatus of the present disclosure, the storage device stores the tolerance information indicating the tolerance for the undetected object for each class of the object. The likelihood threshold is calculated based on the tolerance information. As a result, since the degree of tolerance for non-detection is reflected in the value of the likelihood threshold, it is possible to perform efficient object detection according to the class of the object.

BRIEF DESCRIPTION OF DRAWINGS

FIG. 2 is a diagram showing an example of a tolerance map;

FIG. 4 is a comparison diagram comparing various performances of ranging sensors;

DETAILED DESCRIPTION

Hereinafter, embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment

1-1. Configuration of Object Recognition Apparatus

Figure 1:
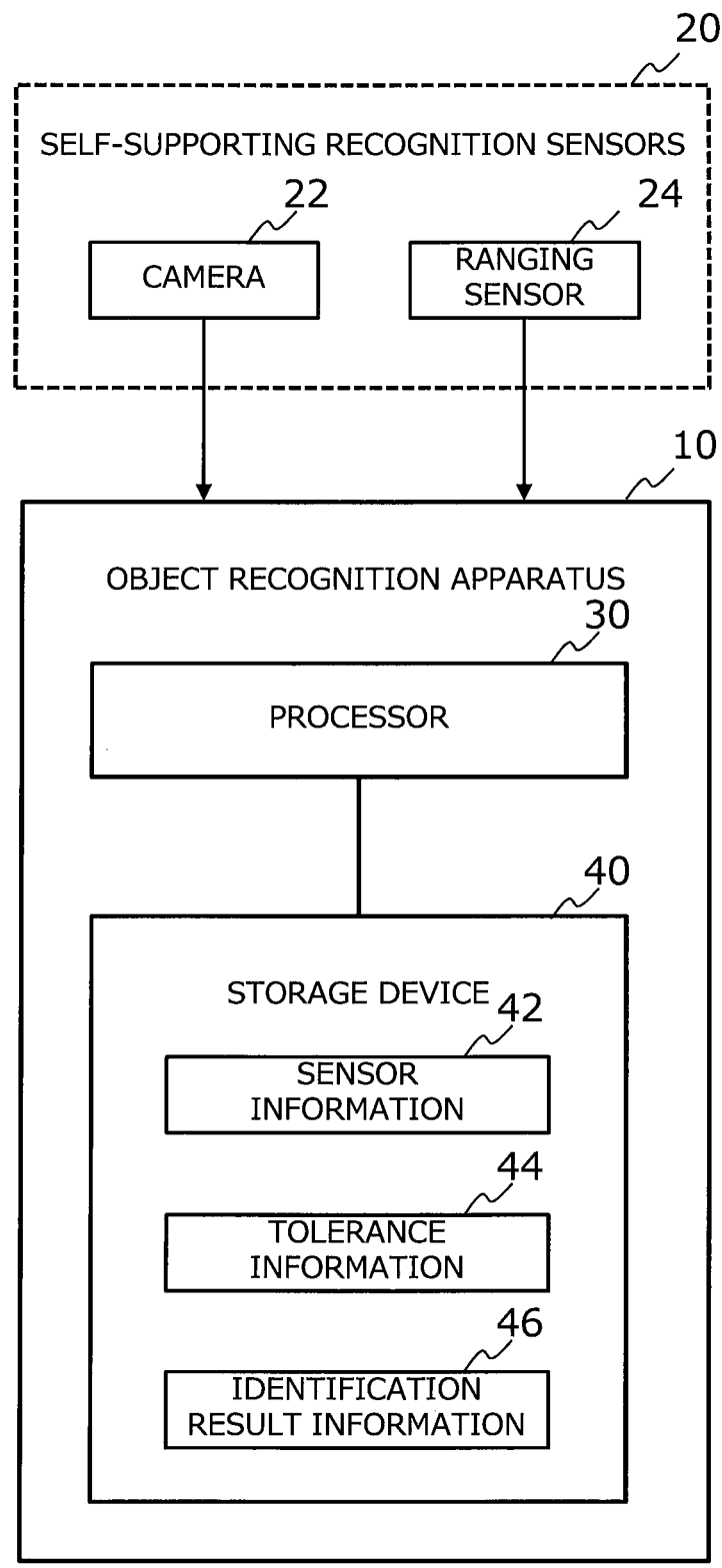
FIG. 1 is a block diagram for explaining a configuration of an object recognition apparatus according to first embodiment.

FIG. 1 is a block diagram for explaining a configuration of an object recognition apparatus according to the first embodiment. The object recognition apparatus 10 is connected to self-supporting recognition sensors 20 mounted on a vehicle. The self-supporting recognition sensors 20 function as a sensor device for acquiring peripheral information of the vehicle, and include a camera 22 and a ranging sensor 24.

The camera 22 is an imaging device for imaging an image of the periphery of the vehicle. The camera 22 is installed, for example, toward the front of the vehicle above a windshield in the vehicle compartment.

The ranging sensor 24 is a sensor capable of measuring a distance from a vehicle to a target object, and includes, for example, a LIDAR: Laser Imaging Detection and Ranging, or a radar. The ranging sensor 24 is installed, for example, on the roof of a vehicle and outputs a transmitted wave and receives reflected waves from a ranging point of the object. The distance and direction to the object are detected by using the receiving state of the reflected wave.

The object recognition apparatus 10 recognizes objects around the vehicle. The object recognition apparatus 10 includes a processor 30 and a storage device 40. Various information is stored in the storage device 40. The processor 30 performs various processes by executing a computer program. The computer program is stored in a storage device 40. A computer program may be recorded on a computer readable recording medium.

The processor 30 performs a "sensor information acquisition process" for acquiring sensor information 42. The processor 30 stores the acquired sensor information 42 in the storage device 40. The sensor information 42 includes image data acquired by the camera 22 and ranging data acquired by the ranging sensor 24. The ranging data includes information on the distance to a ranging point, information on the height of the ranging point, and information on the direction of the ranging point.

Further, the processor 30 performs an "object recognition process" for recognizing an object around the vehicle. As will be described later, the processor 30 performs the object recognition process based on the sensor information 42 and tolerance information 44.

The tolerance information 44 is information representing, by class, the level of the risk of the object becoming undetected in the object recognition process. In other words, the tolerance information 44 can also be regarded as information indicating a tolerance level at which an object is not detected in the object recognition process. The storage device 40 stores the tolerance information 44 indicating the degree of tolerance for each class, for example, a digitized map. This map is hereinafter referred to as a "tolerance map". FIG. 2 is a diagram showing an example of tolerance map. As shown in the drawing, the tolerance map is digitized and stored for each class, such as vehicle, pedestrian, motorcycle, and bicycle. The tolerance is expressed as a smaller numerical value, for example, as the tolerance to undetected is lower, that is, as the risk to undetected is higher. Typically, the tolerance is set lower for classes that have a greater impact on human life, such as pedestrians or bicycles.

The object recognition apparatus 10 is realized by, for example, a microcomputer installed on a vehicle. However, the object recognition apparatus 10 may not necessarily be installed on the vehicle. The installation position of the object recognition apparatus 10 is not limited as long as the information necessary for the object recognition process can be acquired. Hereinafter, the object recognition process will be described in more detail.

1-2. Object Recognition Process

Figure 3:
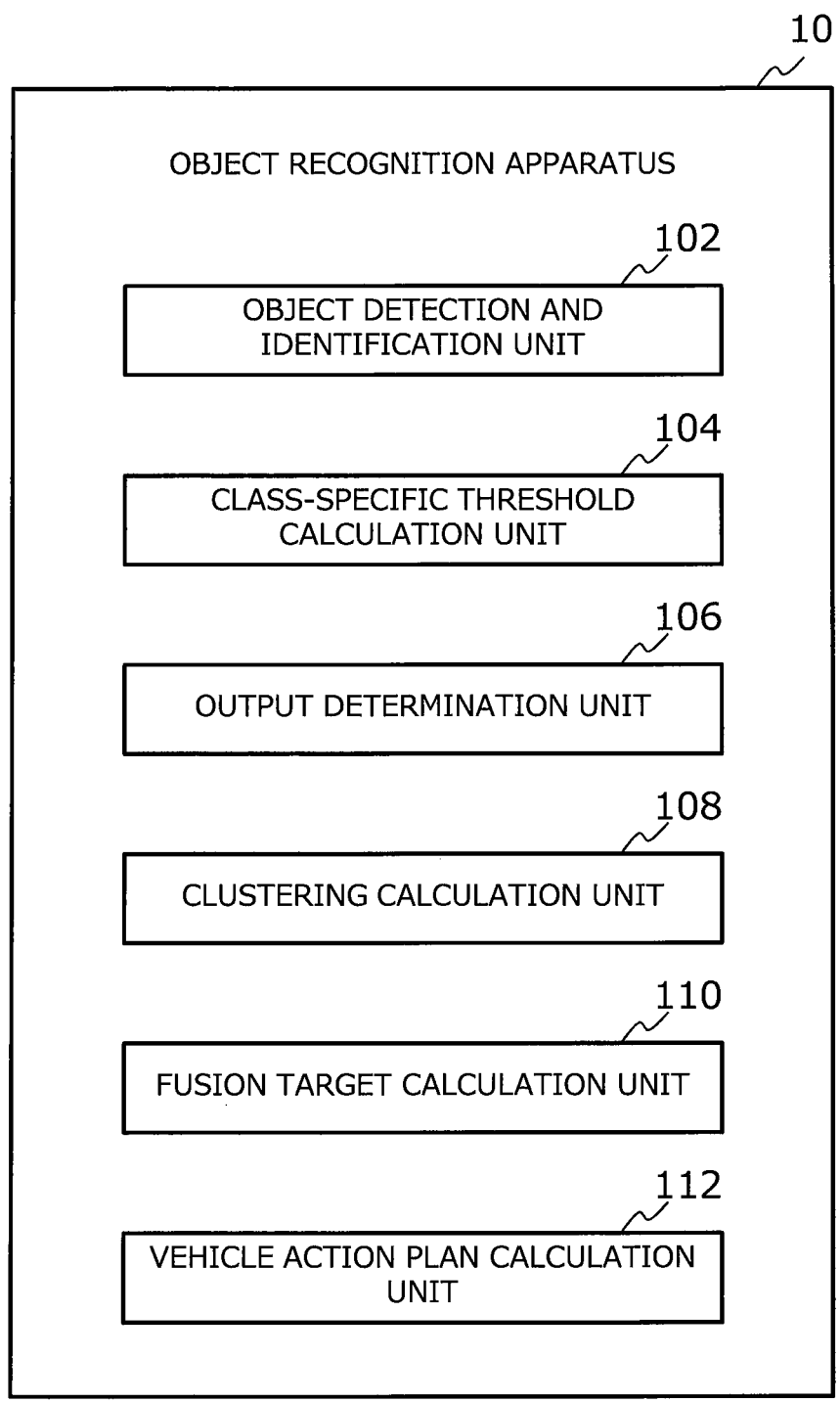
FIG. 3 is a block diagram showing a function for the object recognition apparatus to perform the object recognition process.

FIG. 3 is a block diagram showing a function of the object recognition apparatus for performing object recognition process. The object recognition process is realized by an object detection and identification unit 102, a class-specific threshold calculation unit 104, an output determination unit 106, a clustering calculation unit 108, a fusion target calculation unit 110, and a vehicle action plan calculation unit 112 included in the object recognition apparatus 10. The units 102, 104, 106, 108, 110, and 112 are implemented software when a computer program stored in the storage device 40 is executed by the processor 30.

The object detection and identification unit 102 receives the image data input by the sensor information acquisition process, and detects objects in the image. The object detection and identification unit 102 identifies the position, size, class, and likelihood of the detected object, and stores the identification result in the storage device 40 as an identification result information 46. The likelihood here is a parameter representing the degree of probability in the class for the detected object. The object, class, and likelihood identified by the object detection and identification unit 102 are hereinafter referred to as "identification target," "identification class," and "identification likelihood," respectively. Typically, the identification likelihood can be represented by a numerical value between 0 and 1. The lower the probability, the closer the identification likelihood is to "0", and the higher the probability, the closer the identification likelihood is to "1". The identification result information 46 identified by the object detection and identification unit 102 is also output to the class-specific threshold calculation unit 104 and the output determination unit 106.

The class-specific threshold calculation unit 104 calculates a likelihood threshold by using the identification result information 46 as an input. The class-specific threshold calculation unit 104 specifies the tolerance corresponding to the identification class included in the identification result information 46 by using the tolerance information 44 (tolerance map) stored in the storage device 40. Then, the class-specific threshold calculation unit 104 calculates the likelihood threshold based on the specified tolerance. Typically, the lower the tolerance, the smaller the likelihood threshold is calculated. The calculated likelihood threshold is output to the output determination unit 106.

The output determination unit 106 determines whether or not to output the identification result by using the identification likelihood included in the identification result information 46 and the likelihood threshold calculated by the a class-specific threshold calculation unit 104 as inputs. When the identification likelihood is larger than the likelihood threshold value, the output determination unit 106 outputs the identification result information 46 to the fusion target calculation unit 110. On the other hand, when the identification likelihood is equal to or less than the likelihood threshold, the output determination unit 106 discards the identification result information 46 stored in the storage device 40.

The clustering calculation unit 108 performs "clustering process" for clustering the ranging data acquired by the sensor information acquisition process. The clustering process is performed based on the position and height of each ranging point in a reference coordinate system. The reference coordinate system here is, for example, a coordinate system centered on the vehicle and taking Y-axis (horizontal axis) is taken in the lateral direction and X-axis (vertical axis) in the longitudinal direction of the vehicle. The clustering process is performed so as to maintain continuity with the result of the clustering process in the previous frame. The specific method of the clustering process by the clustering calculation unit 108 is not particularly limited. Known clustering methods can be used. The ranging point group subjected to the clustering process is surrounded by, for example, a rectangular frame in the reference coordinate system and is set as one target. The position of the target in the frame of reference indicates the relative position of the detected object relative to its own vehicle, and the range of the frame of the target indicates the range on the plane of the detected object. The target derived by the clustering process is hereinafter referred to as a "clustering target." The calculated clustering target is output to the fusion target calculation unit 110. The shape of the frame of the target is not limited to a rectangle, for example, a trapezoid or an ellipse may be adopted a shape that approximates the shape indicated by the ranging point group.

The fusion target calculation unit 110 performs "fusion process" in which the clustering target calculated by the clustering calculation unit 108 and the identification target identified by the output determination unit 106 are recognized as the same object. FIG. 4 is a comparison diagram comparing various performances of ranging sensors. Generally, LIDAR and radar are superior to camera in terms of measurement accuracy, but they are inferior in terms of resolution. In object recognition process, it becomes important to combine the features of these sensors successfully by the fusion process.

In the fusion process, the fusion target calculation unit 110 adds the identification result information 46 input from the output determination unit 106 to the clustering target input from the clustering calculation unit 108. The target subjected to the fusion process is hereinafter referred to as a "fusion target". The computed fusion target is output to the vehicle action plan calculation unit 112.

The vehicle action plan calculation unit 112 receives the calculation result in the fusion target calculation unit 110 and calculates the action plan of the vehicle. The action plan of the vehicle here is an action plan for driving support control or automatic operation control using the results of the object recognition process.

1-3. Specifically Processing Performed in Object Recognition Process

Figure 5:
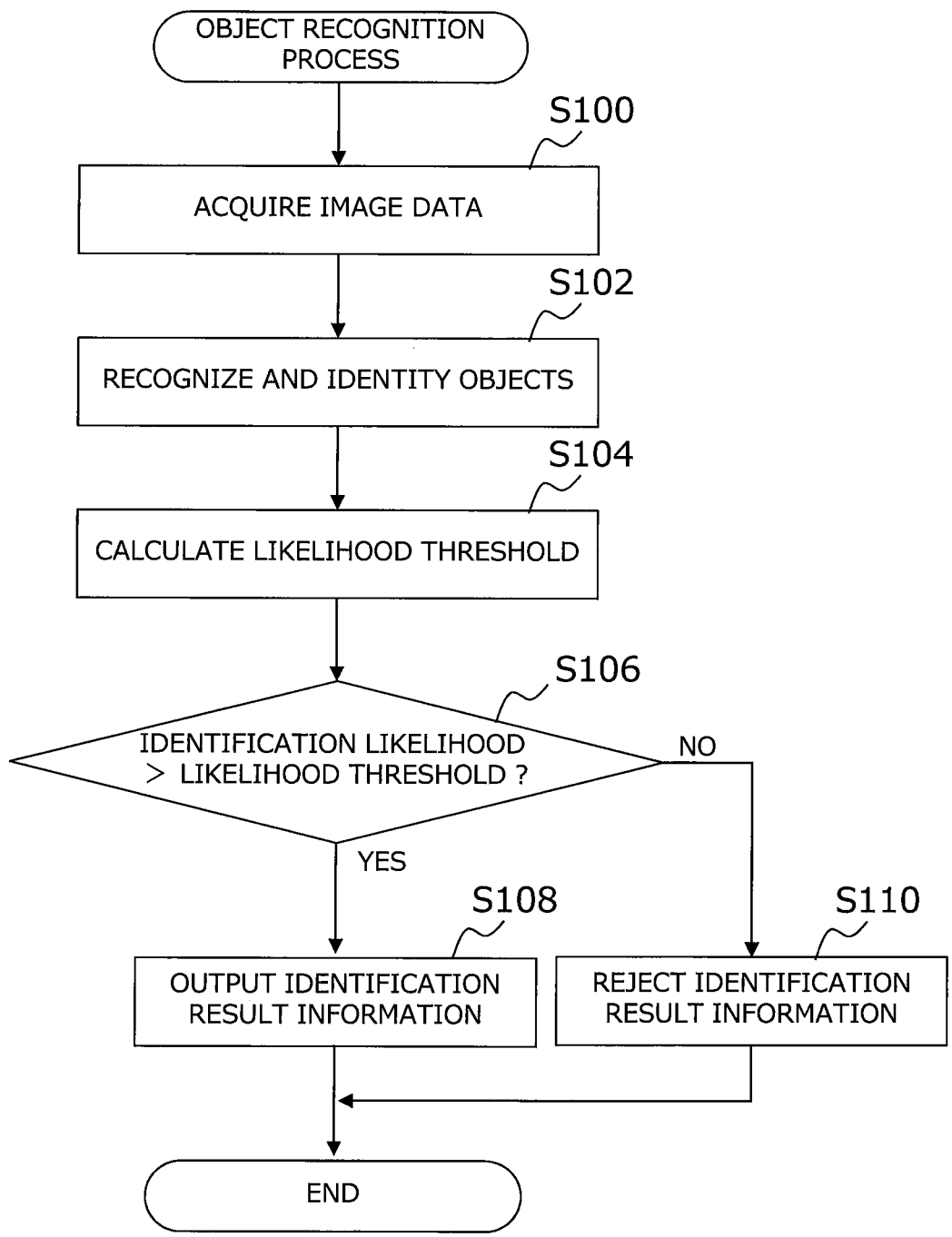
FIG. 5 is a flowchart showing a flow of the object recognition process of the first embodiment.
Figure 6:
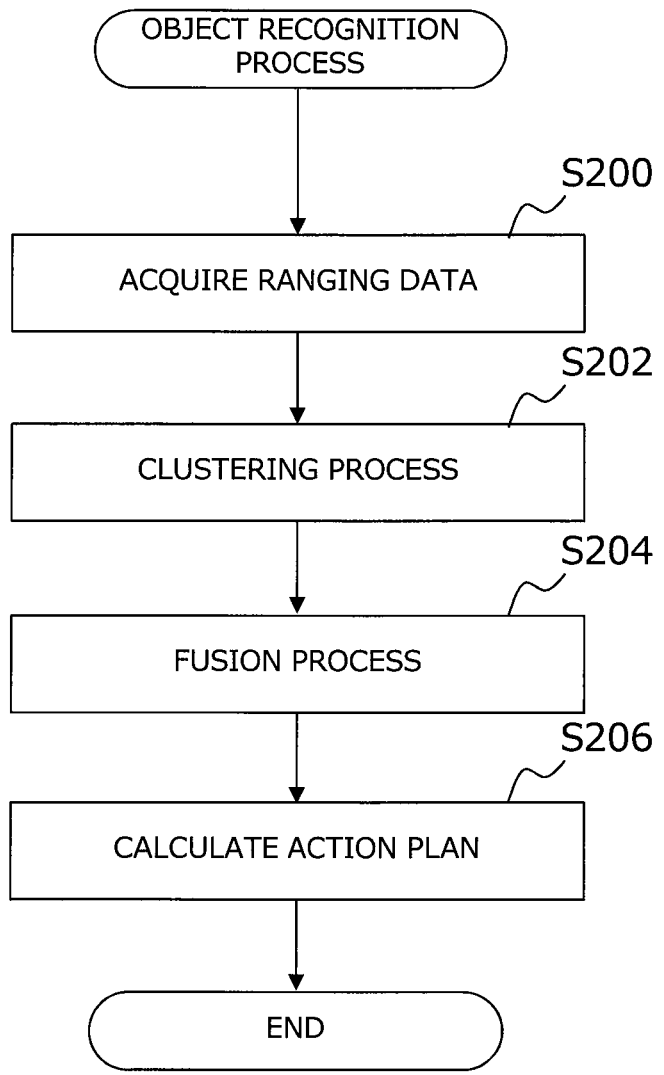
FIG. 6 is a flowchart showing a flow of the object recognition process of the first embodiment.

With the functions of the respective units 102, 104, 106, 108, 110, and 112 described above, the object recognition apparatus 10 functions as an apparatus for performing object recognition process for recognizing objects around a vehicle. FIGS. 5 and 6 are flowcharts showing the flow of the object recognition process according to the first embodiment. The processor 30 of the object recognition apparatus 10 executes the processes shown in these flowcharts at predetermined intervals.

Figure 7:
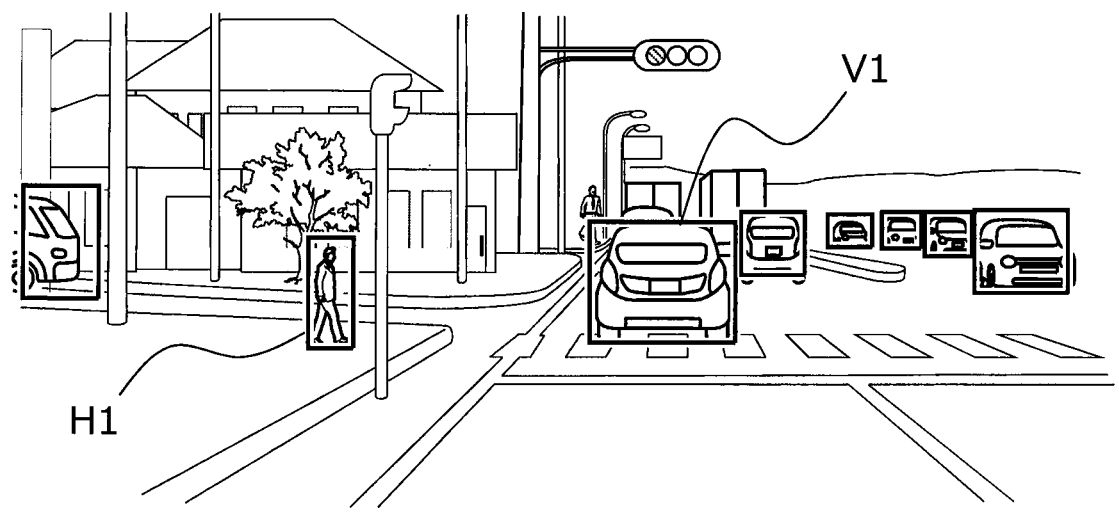
FIG. 7 is a diagram showing an image of the identification result of the image data.

First, the processing of the flowchart shown in FIG. 5 will be described. In step S100, image data around the vehicle are acquired by the camera 22. In the step S102, objects in the image data are detected, and the identification result information 46 including the identification target, the identification class, and the identification likelihood is calculated for each of the detected objects. An image of the identification result of the image data is shown in FIG. 7. In the example shown in FIG. 7, the identification target identified by the object detection and identification unit 102 is represented by being surrounded by a rectangle. For example, in the image, the identification target T1 of the preceding vehicle or the identification target H1 of the pedestrian or the like is represented in front of the vehicle.

In step S104, the likelihood threshold corresponding to the identification class of the object identified in step S102 is calculated using the tolerance information 44. In the following step S106, it is determined whether the identification likelihood is greater than the likelihood threshold. Then, if the identification likelihood is greater than the likelihood threshold, the process proceeds to step S108, and if the identification likelihood is less than or equal to the likelihood threshold, the process proceeds to step S110.

In step S108, the identification result information 46 identified in step S102 is output to the fusion target calculation unit 110. On the other hand, in step S110, the identification result information 46 identified in step S102 is rejected. When the process of step S108 or step S110 is completed, the routine is terminated.

Figure 8:
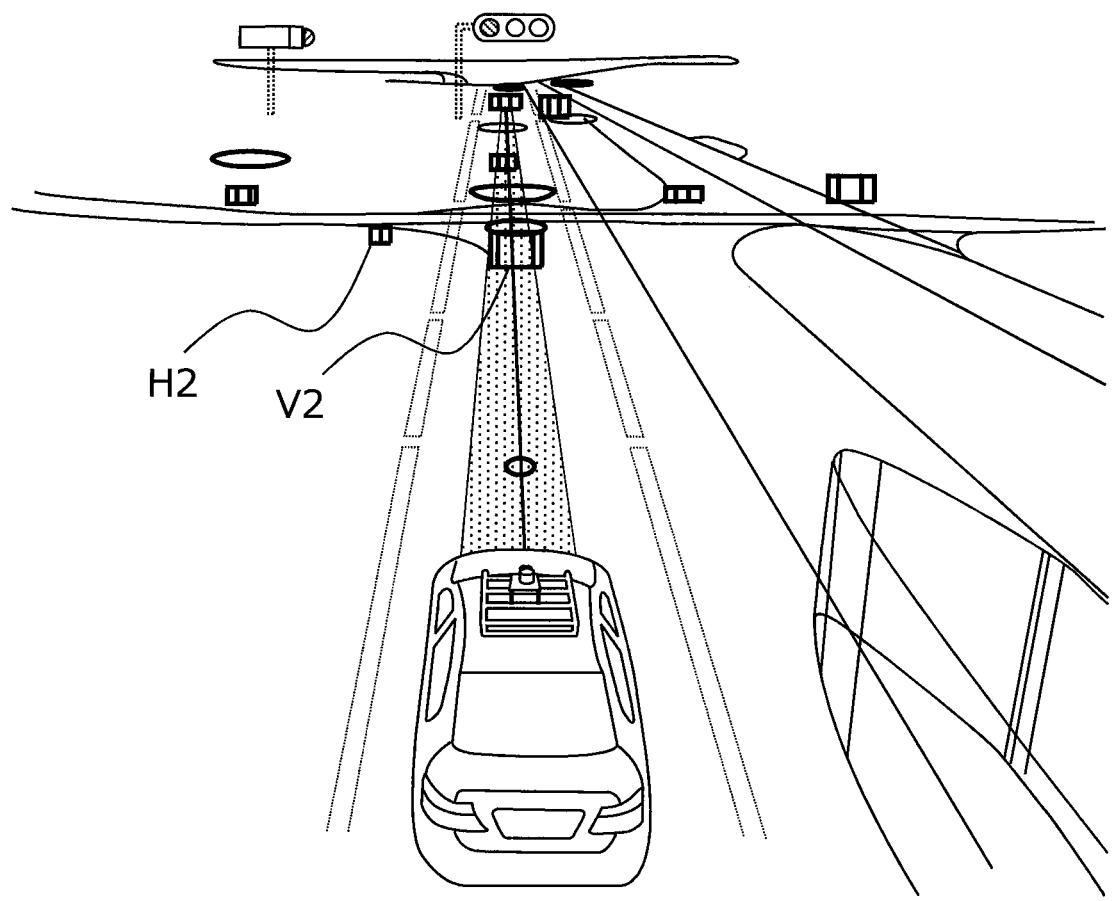
FIG. 8 is a diagram showing an image of the result of performing the clustering process on the ranging point group.

Next, the processing of the flowchart shown in FIG. 6 will be described. The processor 30 of the object recognition apparatus 10 executes the processing of the flowchart shown in FIG. 6 in parallel with the processing of the flowchart shown in FIG. 5. In step S200, ranging data of objects present around the vehicle is acquired by the ranging sensor 24, such as a radar or a LIDAR. In step S202, the ranging data acquired in step S200 is subjected to the clustering process, and the ranging point group is targeted as a clustering target. FIG. 8 shows an image of the result of performing the clustering process on the ranging point group. In the example shown in FIG. 8, clustering targets targeted by the clustering process are represented by being surrounded by a rectangle. For example, in this image, in front of the vehicle, clustering target T2 of the preceding vehicle and the pedestrian clustering target H2 or the like is represented.

Figure 9:
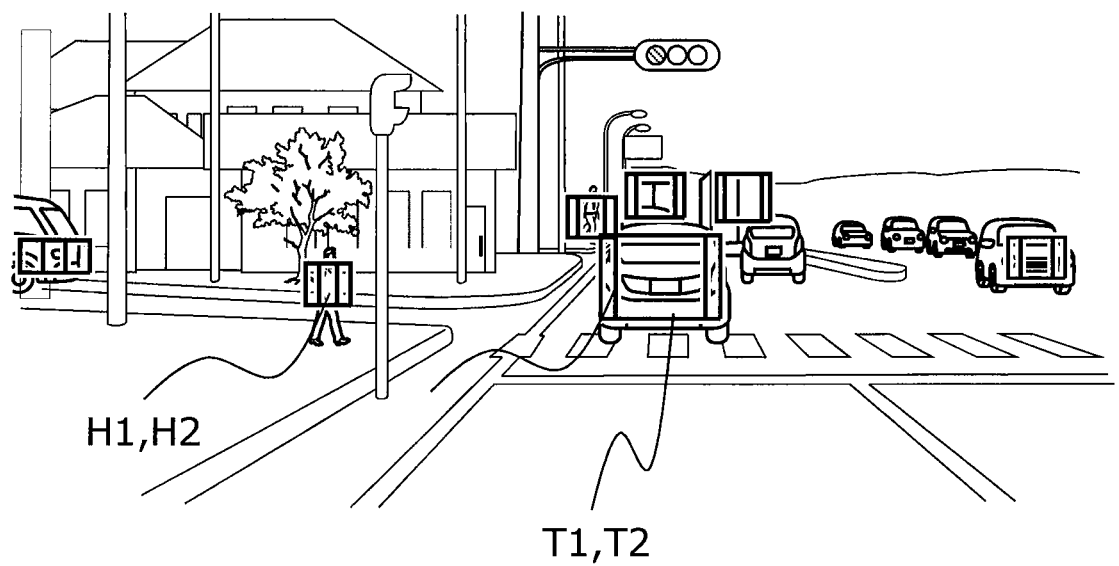
FIG. 9 is a diagram showing an image of the result of superimposing the clustering target on an identification result of image data by the fusion process.

In step S204, the clustering target calculated by the clustering calculation unit 108 and the identification target identified by the output determination unit 106 are recognized as the same object. FIG. 9 shows an image obtained as a result of superimposing a clustering target on an identification result of image data by the fusion process. In step S206, the fusion target recognized as the same object is used for the calculation of the action plans of the vehicles.

According to the object recognition process performed in the above procedure, since the likelihood threshold reflecting the degree of tolerance is calculated for each class of the object, it is possible to reduce the undetected object having a low degree of tolerance, that is, the undetected object having a high risk. This makes it possible to increase the safety of the action plan of the vehicle because the unclassified target in the subsequent fusion process is reduced.

Further, according to the object recognition process of the first embodiment, since the tolerance is reflected on the likelihood threshold, it is not necessary to reflect the tolerance on the identification result information 46 calculated by the object detection and identification unit 102. This makes it possible to generalize the configuration of the object detection and identification unit 102.

1-4. Modified Example of Object Recognition Apparatus According to First Embodiment The object recognition apparatus 10 according to the first embodiment may be applied with a configuration modified as described below.

The object detection and identification unit 102 is not limited to a configuration in which an object in the image is detected using the image data acquired by the camera 22 as an input, but may be configured to detect an object in the image using the ranging data acquired by the ranging sensor 24 such as a LIDAR or a radar as an input. This modification can also be applied to other embodiments described later.

2. Second Embodiment

Next, the object recognition apparatus, according to the second embodiment will be described with reference to the drawings.

2-1. Summary of Object Recognition Apparatus According to Second Embodiment

In the object recognition apparatus according to the first embodiment, the value of the likelihood threshold for each class is calculated using the tolerance map in which the tolerance for each class is stored. Here, the risk for undetected objects differs depending on the self-position of the vehicle. For example, if a vehicle is located near a pedestrian crossing, there is a higher probability that there are pedestrians than in other locations. Therefore, in the vicinity of the pedestrian crossing, for example, it can be said that it is preferable from the viewpoint of safety to set the likelihood threshold for the pedestrian higher, by setting the pedestrian tolerance lower. On the other hand, for example, if the vehicle is located on an expressway, there is less possibility that there are pedestrians than if it is located on a general moving road. Therefore, on the highway, for example, it can be said that setting the likelihood threshold for pedestrians high by setting the tolerance high is preferable from the viewpoint of smooth running of the vehicle. As described above, in the object recognition process using a single tolerance map, there is a possibility that the object recognition process may not be optimized according to the self-position of the vehicle.

Therefore, the object recognition apparatus 10 according to the second embodiment performs "tolerance map selection process" for selecting an optimum tolerance map corresponding to the self-position of the vehicle from among a plurality of tolerance maps. The object recognition apparatus 10 according to the second embodiment has a plurality of tolerance maps associated with geographic region classification. The region classification here is, for example, a highway, a general road, an urban area, a vicinity of a crosswalk, or the like. In the tolerance map selection process, the processor 30 identifies the region classification to which the self-position of the vehicle belongs and selects the corresponding tolerance map. Then, the processor 30 calculates the likelihood threshold corresponding to the detected object using the selected tolerance map. According to such a tolerance map selection process, it is possible to set the likelihood threshold that reflects information about the self-position of the vehicle, so that it is possible to increase the identification rate of the object without increasing the false detection rate of the object.

Figure 10:
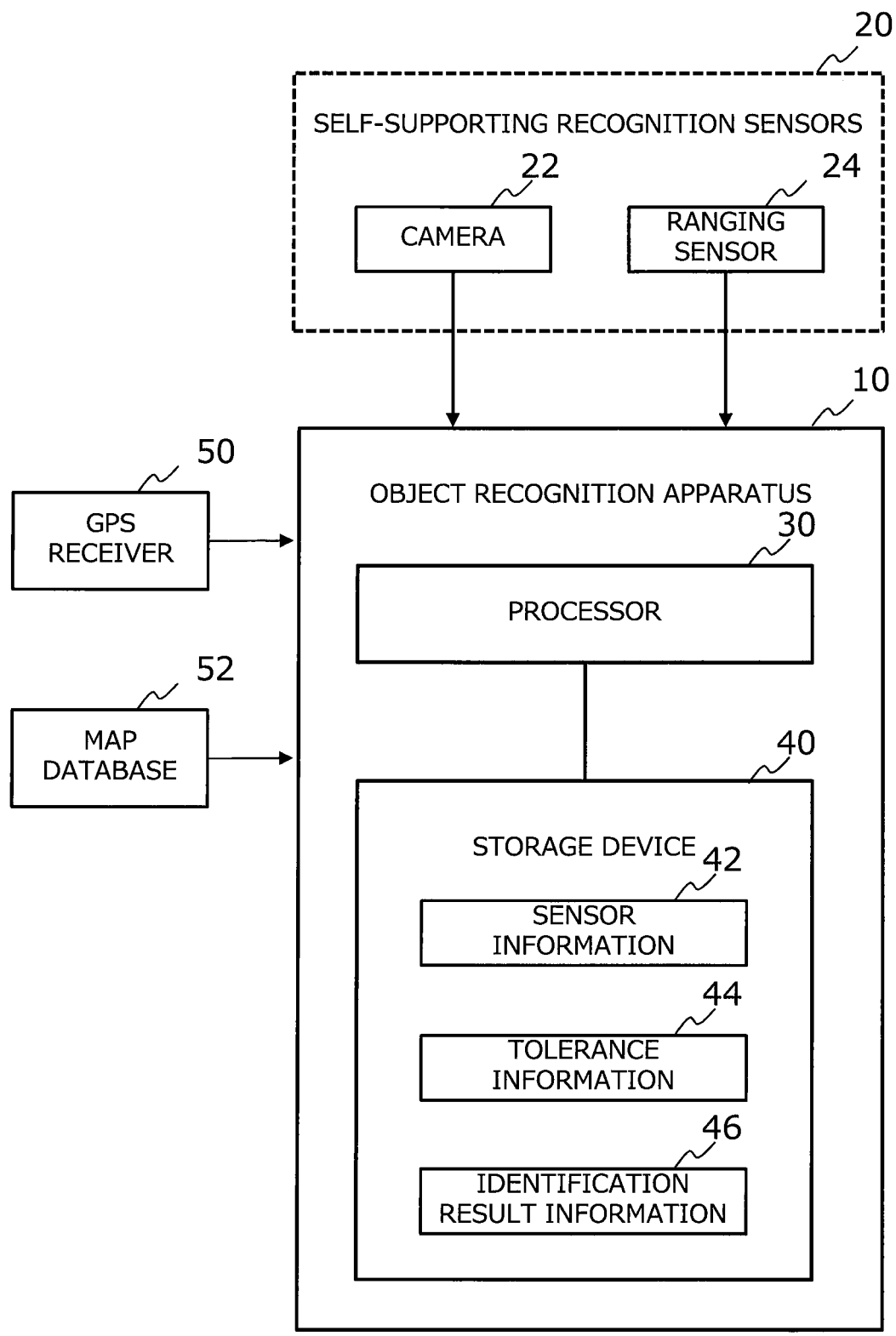
FIG. 10 is a block diagram for explaining the configuration of an object recognition apparatus according to the second embodiment.

2-2. Configuration of Object Recognition Apparatus According to Second Embodiment FIG. 10 is a block diagram for explaining a configuration of an object recognition apparatus according to the second embodiment. The object recognition apparatus 10 according to the second embodiment is basically the same as the object recognition apparatus 10 according to the first embodiment shown in FIG. 1 except for a part of the configuration. Therefore, here, the difference from the object recognition apparatus 10 of the first embodiment shown in FIG. 1 will be mainly described, and a detailed description of common elements will be omitted.

The object recognizer 10 according to the second embodiment, a GPS (Global Positioning System) receiver 50 and a map database 52 is connected. The GPS receiver 50 is mounted on the vehicle and acquires position information indicating the position of the vehicle based on the signal transmitted by the GPS satellite. The map database 52 is formed in a storage such as an HDD (Hard Disk Drive) or an SSD (Solid State Drive) mounted on a vehicle, for example. The map information included in the map database 52 includes road position information, road shape information, intersection and branch point position information, road lane information, and the like. The map database 52 may be stored in the storage device 40 of the object recognition apparatus. The tolerance information 44 stored in the storage device 40 includes a plurality of tolerance maps associated with each region classification of the self-position of the vehicle.

Figure 11:
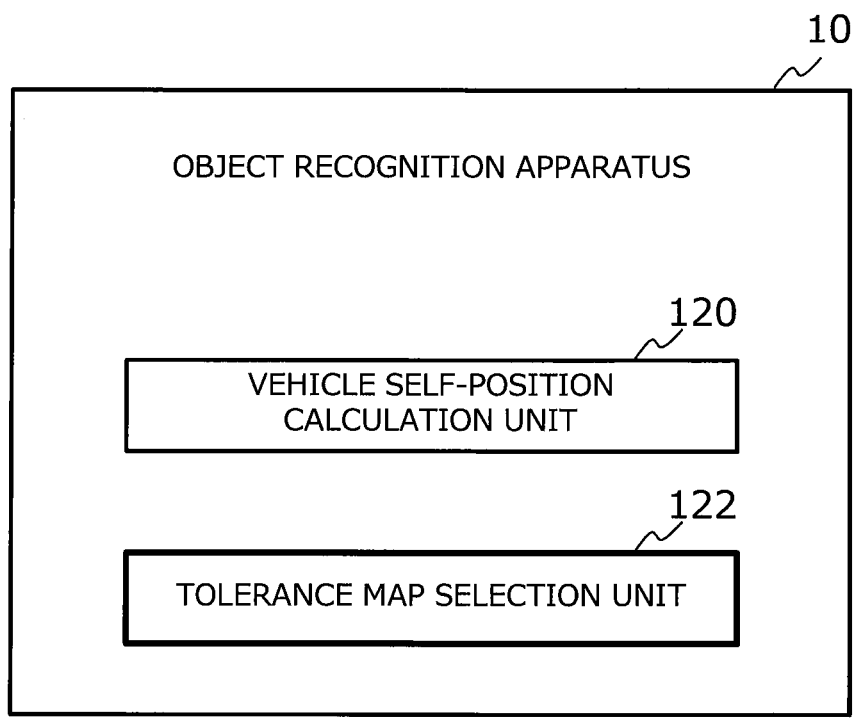
FIG. 11 is a block diagram showing a function for performing the tolerance map selection process according to the second embodiment.

FIG. 11 is a block diagram showing a function for performing tolerance map selection process by the object recognition apparatus according to the second embodiment. The tolerance map selection processing according to the second embodiment is realized by a vehicle self-position calculation unit 120 and a tolerance map selection unit 122. Position information acquired by the GPS receiver 50 is input to the vehicle self-position calculation unit 120. The vehicle self-position calculation unit 120 estimates the self-position of the vehicle based on the input position information and the map information included in the map database 52. The estimated self-position is output to the tolerance map selection unit 122.

The tolerance map selection unit 122 acquires the region classification to which the input self-position belongs. Then, the tolerance map selection unit 122 selects the tolerance map associated with the region classification from the plurality of tolerance maps included in the tolerance information 44. In the object recognition process, the tolerance map selected in the tolerance map selection unit 122 is used for calculating the likelihood threshold.

According to the tolerance map selection process performed in the above procedure, it is possible to use the tolerance map corresponding to the self-position of the vehicle in the object recognition process. This makes it possible to increase the identification rate of the object without increasing the false detection rate of the object.

2-3. Modification of Object Recognition Apparatus According to Second Embodiment The object recognition apparatus 10 according to the second embodiment may be applied with a configuration modified as described below.

The method of estimating the self-position executed in the vehicle self-position calculation unit 120 is not limited. That is, processes for estimating the self-position of a vehicle have already been known in many documents. In the process in the vehicle self-position calculation unit 120, it is possible to estimate the self-position of the vehicle by appropriately applying these known methods.

3. Third Embodiment

Next, the object recognition apparatus according to the third Embodiment will be described with reference to the drawings.

3-1. Summary of Object Recognition Apparatus According to Third Embodiment

In the object recognition apparatus according to the second embodiment, the tolerance map selection process is performed based on the self-position of the vehicle. Here, the image data obtained from the camera 22 also varies depending on a peripheral environment condition of the vehicle. For example, since the visibility becomes unclear by raindrops adhering to the windshield of the vehicle during rainfall, there is a possibility that undetected of an object such as a pedestrian is increased. Therefore, in the object recognition process using a single tolerance map, there is a possibility that the object recognition process may not be optimized according to the weather around the vehicle, e.g., rainfall.

The object recognition apparatus 10 according to the third embodiment has a plurality of tolerance maps associated with rainfall condition as the peripheral environment condition. In the tolerance map selection process of the object recognition apparatus 10 according to the third embodiment, the optimum tolerance map is selected based on the amount of rainfall of the vehicle. The plurality of tolerance maps include, for example, a first tolerance map selected when the amount of rainfall is greater than or equal to a predetermined threshold and a second tolerance map selected when the amount of rainfall is less than the predetermined threshold. For example, the first tolerance map may have a lower tolerance for the same object than the second tolerance map. In the tolerance map selection process, the processor 30 selects a corresponding tolerance map in accordance with the rainfall amount. This makes it possible to reduce the undetected risk according to the amount of rainfall.

Figure 12:
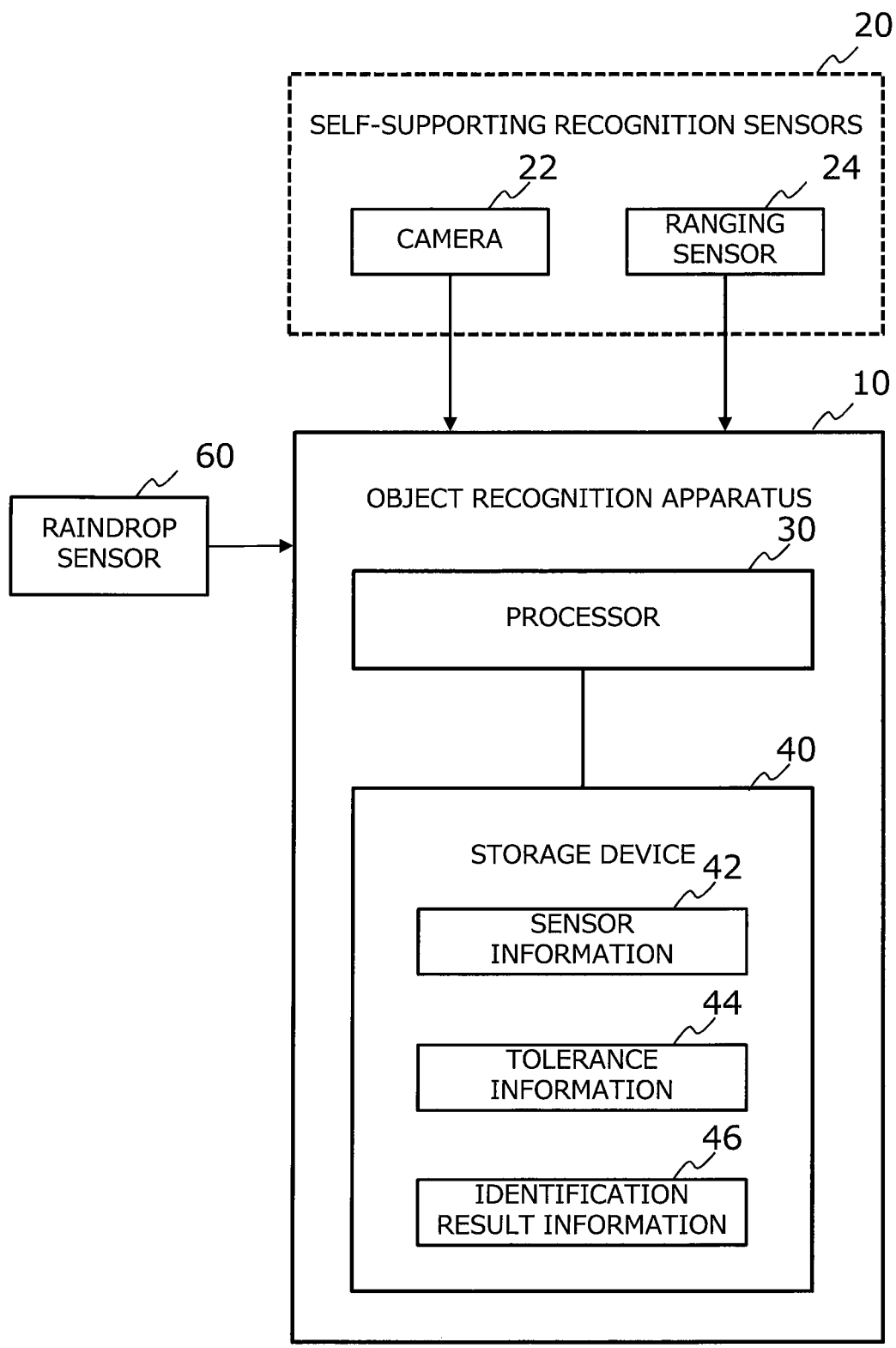
FIG. 12 is a block diagram for explaining the configuration of an object recognition apparatus according to the third embodiment.

3-2. Configuration of Object Recognition Apparatus According to Third Embodiment FIG. 12 is a block diagram for explaining a configuration of an object recognition apparatus according to the third embodiment. The object recognition apparatus 10 according to the third embodiment is basically the same as the object recognition apparatus 10 according to the first embodiment shown in FIG. 1 except for a part of the configuration. Therefore, here, the difference from the object recognition apparatus 10 of the first embodiment shown in FIG. 1 will be mainly described, and a detailed description of common elements will be omitted.

The object recognition apparatus 10 according to the third embodiment is connected to a raindrop sensor 60. The rain drop sensor 60 is mounted, for example, on the windshield of the vehicle, and outputs a signal corresponding to the amount of raindrops adhering to the windshield. The configuration of the raindrop sensor 60 is not limited. As the raindrop sensor 60, known sensor for detecting the amount of rainfall may be used. The tolerance information 44 stored in the storage device 40 includes a plurality of tolerance maps associated with the amount of rainfall.

Figure 13:
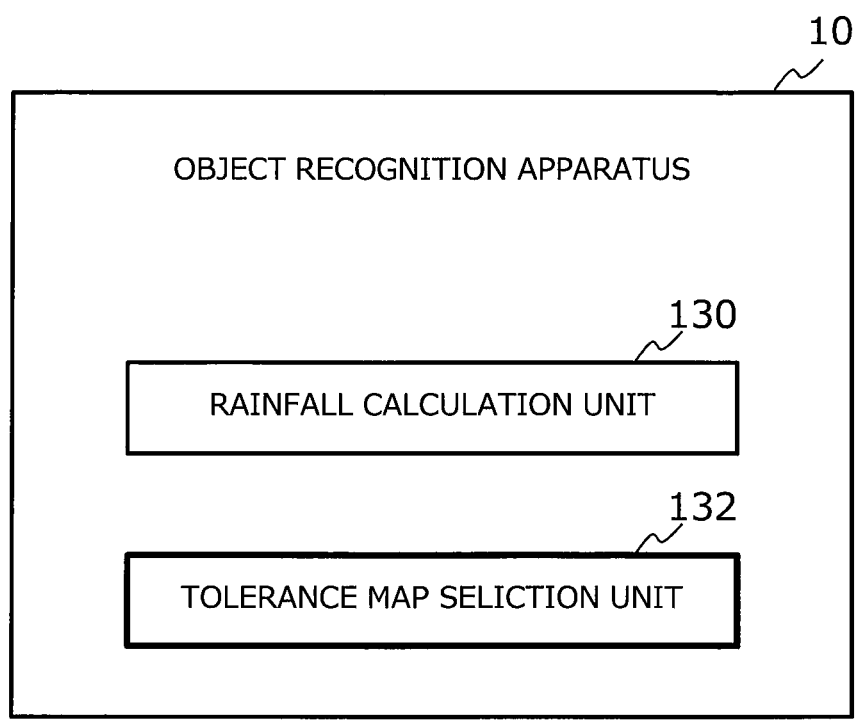
FIG. 13 is a block diagram showing a function for performing the tolerance map selection process according to the third embodiment.

FIG. 13 is a block diagram showing a function for performing tolerance map selection process by the object recognition apparatus according to the third embodiment. The tolerance map selection process according to the third embodiment is realized by a rainfall calculation unit 130 and a tolerance map selection unit 132. The output signal of the raindrop sensor is input to the rainfall calculation unit 130. The rainfall calculation unit 130 estimates the amount of rainfall around the vehicle based on the input signal from the raindrop sensor. The estimated amount of rainfall is output to the tolerance map selection unit 132.

The tolerance map selection unit 132 determines whether the input rainfall amount is equal to or greater than a predetermined threshold value. Then, when the input rainfall amount is equal to or greater than the predetermined threshold value, the tolerance map selection unit 132 selects the tolerance map associated with the first rainfall amount from the plurality of tolerance maps included in the tolerance information 44. On the other hand, when the input rainfall is less than the predetermined threshold, the tolerance map selection unit 122 selects the tolerance map associated with the second rainfall amount from the plurality of tolerance maps included in the tolerance information 44. In the object recognition process, the tolerance map selected by the tolerance map selection unit 122 is used for calculating the likelihood threshold.

According to the tolerance map selection process performed in the above procedure, the tolerance map corresponding to the rainfall amount is selected in the object recognition process. Thus, since the influence of rainfall may be reflected in the object detection, it is possible to increase the identification rate of the object without increasing the false detection rate.

3-3. Modification of Object Recognition Apparatus According to Third Embodiment

The object recognition apparatus 10 according to the third embodiment may be applied with a configuration modified as described below.

The content of the plurality of tolerance maps is not limited as long as the plurality of tolerance maps are configured by at least two or more tolerance maps associated with different rainfall condition. For example, the tolerance map may be configured as a plurality of tolerance maps associated with three or more precipitation condition with different amounts of precipitation, such as clear, small rain, heavy rain, etc.

4. Fourth Embodiment

Next, the object recognition apparatus according to the fourth embodiment will be described with reference to the drawings.

4-1. Summary of Object Recognition Apparatus According to Fourth Embodiment

In the object recognition apparatus according to the third embodiment, the tolerance map selection process is performed on the basis of the rainfall condition, which is the peripheral environment condition of the vehicle. Here, the image data obtained from the camera 22 varies not only depending on the amount of rainfall but also, for example, the brightness of the surroundings. For example, in a dark environment such as in a tunnel or at night, there is a possibility that undetected objects such as pedestrians are increased. Therefore, in the object recognition process using a single tolerance map, there is a possibility that the object recognition process may not be optimized according to the brightness around the vehicle.

The object recognition apparatus 10 according to the fourth embodiment has a plurality of tolerance maps associated with illuminance condition around the vehicle as the peripheral environment condition. In the tolerance map selection process of the object recognition apparatus 10 according to the fourth embodiment, the optimum tolerance map is selected based on the illuminance around the vehicle. The plurality of tolerance maps include, for example, a first tolerance map selected when the illuminance is greater than or equal to a predetermined threshold and a second tolerance map selected when the illuminance is less than the predetermined threshold. For example, the first tolerance map may have a lower tolerance for the same object than the second tolerance map. In the tolerance map selection process, the processor 30 selects a tolerance map corresponding to the detected illuminance. This makes it possible to reduce the undetected risk according to the bright/dark state around the vehicle.

Figure 14:
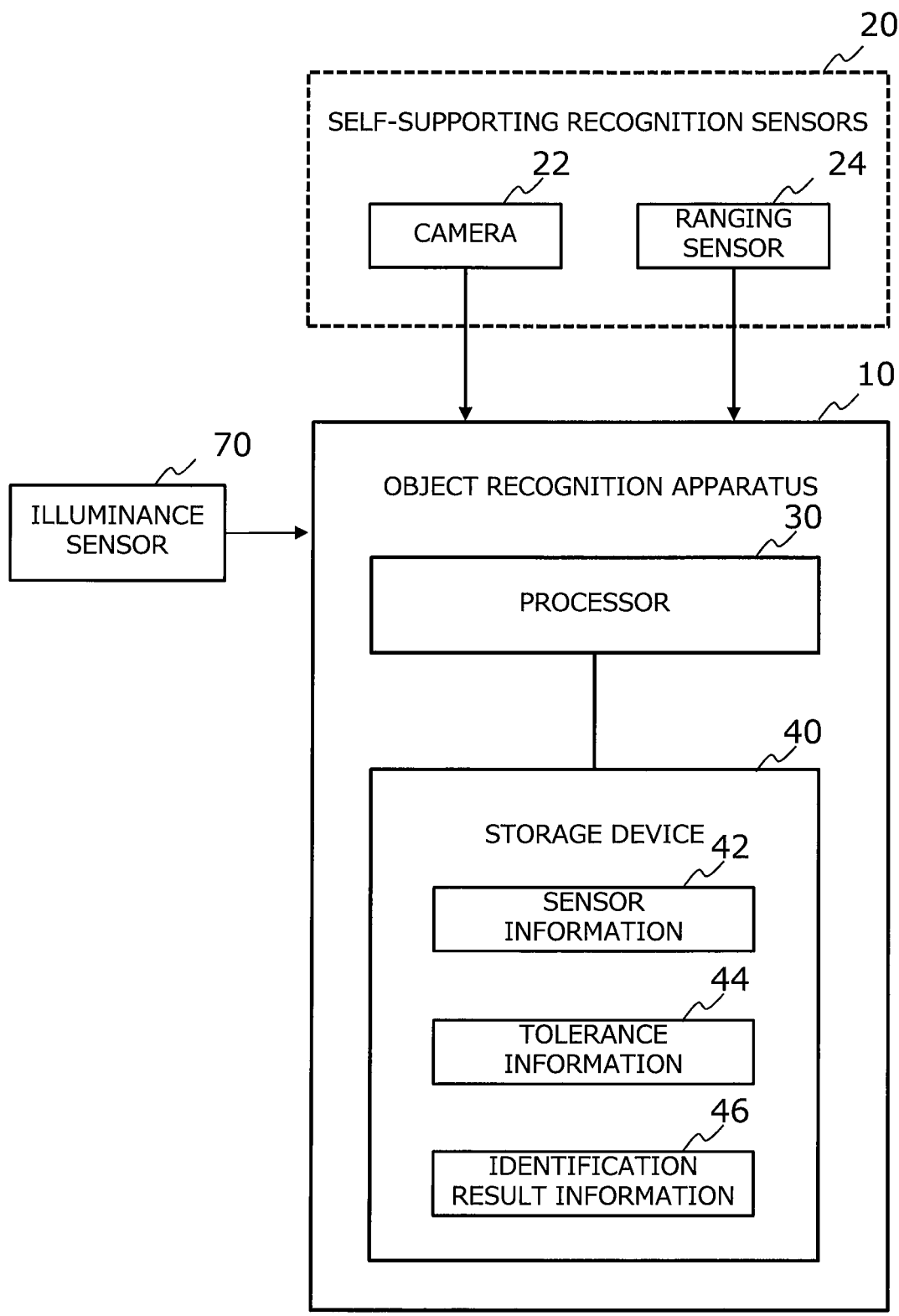
FIG. 14 is a block diagram for explaining the configuration of an object recognition apparatus according to the fourth embodiment.

4-2. Configuration of Object Recognition Apparatus According to Fourth Embodiment FIG. 14 is a block diagram for explaining a configuration of an object recognition apparatus according to the fourth embodiment. The object recognition apparatus 10 according to the fourth embodiment is basically the same as the object recognition apparatus 10 according to the first embodiment shown in FIG. 1 except for a part of the configuration. Therefore, here, the difference from the object recognition apparatus 10 of the first embodiment shown in FIG. 1 will be mainly described, and a detailed description of common elements will be omitted.

The object recognition apparatus 10 according to the fourth embodiment, an illuminance sensor 70 is connected. The Illuminance sensor 70 is mounted, for example, on the windshield of the vehicle, and outputs a signal corresponding to the illuminance condition which is the peripheral environment condition of the vehicle. The structure of the illuminance sensor 70 is not limited. As the illuminance sensor 70, known structures for detecting illuminance may be used. The tolerance information 44 stored in the storage device 40 includes a plurality of tolerance maps associated with the illuminance condition.

Figure 15:
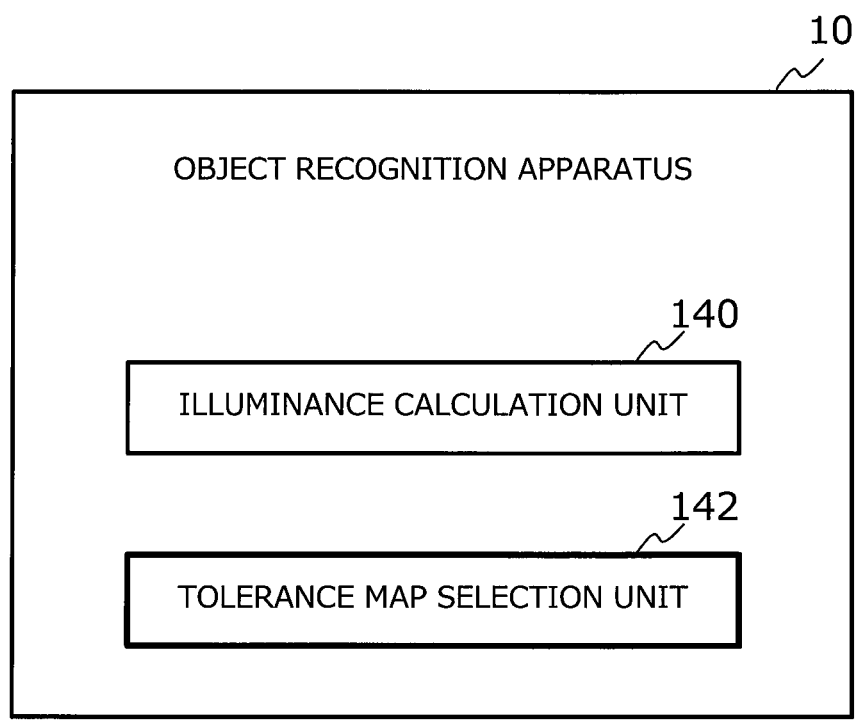
FIG. 15 is a block diagram showing a function for performing the tolerance map selection process according to the fourth embodiment.

FIG. 15 is a block diagram showing a function for performing tolerance map selection processing by the object recognition apparatus according to the fourth embodiment. The tolerance map selection process according to the fourth embodiment is realized by an illuminance calculation unit 140 and a tolerance map selection unit 142. The output signal of the illuminance sensor 70 is input to the illuminance calculation unit 140. The illuminance calculation unit 140 estimates the illuminance around the vehicle based on the input signal from the illuminance sensor 70. The estimated illuminance is output to the tolerance map selection unit 142.

The tolerance map selection unit 142 determines whether the input illuminance is equal to or greater than a predetermined threshold. Then, the tolerance map selection unit 142 selects the first tolerance map from the plurality of tolerance maps included in the tolerance information 44 when the input illuminance is equal to or greater than a predetermined threshold. On the other hand, when the input illuminance is less than the predetermined threshold, the tolerance map selection unit 142 selects the second tolerance map from the plurality of tolerance maps included in the tolerance information 44. In the object recognition process, the tolerance map selected by the tolerance map selection unit 142 is used for calculating the likelihood threshold.

According to the tolerance map selection process performed in the above procedure, it is possible to use the tolerance map selected in accordance with the illuminance around the vehicle in the object recognition process. Thus, since the influence of the brightness around the vehicle may be reflected in the object detection, it is possible to increase the identification rate of the object without increasing the false detection rate of the object.

4-3 Modification of Object Recognition Apparatus According to Fourth Embodiment

The object recognition apparatus 10 according to the fourth embodiment may be applied with a configuration modified as described below.

The content of the plurality of tolerance maps is not limited as long as the plurality of tolerance maps are configured by at least two or more tolerance maps associated with different illuminance condition. For example, the tolerance map may be configured as a plurality of tolerance maps associated with three or more different illumination condition, such as daytime, evening, nighttime, etc.

What is claimed is:

1. An object recognition apparatus for recognizing an object around a vehicle, the vehicle including a sensor device to acquire peripheral information, the object recognition apparatus comprising:

a storage device to store the peripheral information and tolerance information in which tolerance for an undetected object is represented for each class of the object; and a processor to perform object recognition process for recognizing the object around the vehicle, wherein in the object recognition process, the processor is configured to:

identify an object to be detected and a class of the object based on the peripheral information, calculate likelihood that is a parameter representing a probability of detection of the object, calculate a likelihood threshold corresponding to the object based on the tolerance information, and determine whether to output an identification result of the object based on a comparative between the likelihood and the likelihood threshold and wherein the storage device is configured to store a plurality of tolerance information associated with a peripheral environment condition of the vehicle, wherein in the object recognition process, the processor is configured to detect the peripheral environment condition around the vehicle, and select tolerance information corresponding to the peripheral environment condition from the plurality of tolerance information, wherein the processor is configured to calculate the likelihood threshold corresponding to the object based on the selected tolerance information.

2. The object recognition apparatus according to claim 1, wherein the storage device is configured to store a plurality of tolerance information associated with a self-position of the vehicle, wherein in the object recognition process, the processor is configured to:

detect the self-position, select tolerance information corresponding to the self-position from the plurality of tolerance information, and calculate the likelihood threshold corresponding to the object based on the selected tolerance information.

3. The object recognition apparatus according to claim 1, wherein the peripheral environment condition includes rainfall condition indicating the amount of rainfall around the vehicle, wherein in the object recognition process, the processor is configured to detect a rainfall amount as the peripheral environment condition.

4. The object recognition apparatus according to claim 1, wherein the peripheral environment condition includes an illuminance condition indicating the illuminance of the surroundings of the vehicle, wherein in the object recognition process, the processor in configured to detect illuminance as the peripheral environment condition.

5. The object recognition apparatus according to claim 1, wherein the sensor device includes an imaging device to acquire an image of the surrounding environment, wherein the vehicle further comprises a ranging sensor to measure ranging data, wherein the processor is configured to perform a clustering process for clustering the ranging data, and perform a fusion process of recognizing a ranging point group targeted by the clustering process and the identification result as the same object.

* * * * *